US010288118B2

(12) United States Patent
Toda

(10) Patent No.: US 10,288,118 B2
(45) Date of Patent: May 14, 2019

(54) SLIDING MEMBER

(71) Applicant: DAIDO METAL COMPANY LTD., Nagoya (JP)

(72) Inventor: Kazuaki Toda, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 15/915,150

(22) Filed: Mar. 8, 2018

(65) Prior Publication Data
US 2018/0258991 A1 Sep. 13, 2018

(30) Foreign Application Priority Data
Mar. 8, 2017 (JP) ................................. 2017-043927

(51) Int. Cl.
F16C 33/12 (2006.01)
F16C 17/10 (2006.01)
(Continued)

(52) U.S. Cl.
CPC .......... *F16C 33/121* (2013.01); *B22D 13/023* (2013.01); *B22D 19/085* (2013.01);
(Continued)

(58) Field of Classification Search
CPC .... F16C 33/121; F16C 17/10; F16C 2204/10; F16C 2360/22; F16C 2204/12; F16C 2223/44; F16C 2202/50; F16C 33/124; F16C 33/14; F16C 2204/18; F16C 2240/60; B22D 27/045; B22D 19/085; B22D 13/023; C23C 30/00; C23C 30/005;
(Continued)

(56) References Cited

U.S. PATENT DOCUMENTS 5,300,368 A * 4/1994 Kubert ................. F16C 33/124
148/518
6,692,548 B2 * 2/2004 Sakai .................... B22F 1/0003
419/10
2003/0096136 A1 5/2003 Fujita et al.

FOREIGN PATENT DOCUMENTS

GB 2264336 A 8/1993
JP 08-209264 A 8/1996
(Continued)

OTHER PUBLICATIONS

Extended European Search Report issued in corresponding EP Application No. 18158062.2 dated May 9, 2018.

*Primary Examiner* — Michael E. La Villa
(74) *Attorney, Agent, or Firm* — Snyder, Clark, Lesch & Chung, LLP

(57) ABSTRACT

Provided is a sliding material including a substrate; and a copper alloy layer bonded to the substrate. The copper alloy includes 2.0 to 15.0% by mass of tin. The copper alloy layer includes a sliding body part including a sliding surface, and a gradient region including a bond surface with the substrate. A tin concentration in the gradient region reduces from the sliding body part toward the bond surface. A method for producing the siding material is also provided. The method includes preparing the substrate having a first surface and a second surface opposite to the first surface; melting the copper alloy; casting the molten copper alloy on the first surface of the substrate; and solidifying the copper alloy unidirectionally by cooling the substrate from the second surface by a coolant.

13 Claims, 3 Drawing Sheets

(51) Int. Cl.
- *B32B 15/01* (2006.01)
- *B32B 15/18* (2006.01)
- *B32B 15/20* (2006.01)
- *B22D 19/08* (2006.01)
- *B22D 27/04* (2006.01)
- *C22C 9/02* (2006.01)
- *C22C 9/00* (2006.01)
- *C23C 30/00* (2006.01)
- *C23C 28/00* (2006.01)
- *C23C 28/02* (2006.01)
- *B22D 13/02* (2006.01)
- *F16C 33/14* (2006.01)

(52) U.S. Cl.
CPC .......... *B22D 27/045* (2013.01); *B32B 15/015* (2013.01); *B32B 15/18* (2013.01); *B32B 15/20* (2013.01); *C22C 9/00* (2013.01); *C22C 9/02* (2013.01); *C23C 28/021* (2013.01); *C23C 28/36* (2013.01); *C23C 30/00* (2013.01); *C23C 30/005* (2013.01); *F16C 17/10* (2013.01); *F16C 33/124* (2013.01); *F16C 33/14* (2013.01); *F16C 2202/50* (2013.01); *F16C 2204/10* (2013.01); *F16C 2204/12* (2013.01); *F16C 2204/18* (2013.01); *F16C 2223/44* (2013.01); *F16C 2240/60* (2013.01); *F16C 2360/22* (2013.01); *Y10T 428/1291* (2015.01); *Y10T 428/12458* (2015.01); *Y10T 428/12882* (2015.01); *Y10T 428/12903* (2015.01); *Y10T 428/12917* (2015.01); *Y10T 428/12924* (2015.01); *Y10T 428/12993* (2015.01); *Y10T 428/2495* (2015.01); *Y10T 428/24967* (2015.01); *Y10T 428/263* (2015.01); *Y10T 428/264* (2015.01); *Y10T 428/265* (2015.01); *Y10T 428/27* (2015.01); *Y10T 428/273* (2015.01)

(58) Field of Classification Search
CPC ......... C23C 28/021; C23C 28/36; C22C 9/00; C22C 9/02; C22C 9/01; B32B 15/015; B32B 15/20; B32B 15/18; B32B 15/04; B32B 15/043; Y10T 428/12882; Y10T 428/12903; Y10T 428/1291; Y10T 428/12917; Y10T 428/12924; Y10T 428/12993; Y10T 428/2495; Y10T 428/24967; Y10T 428/263; Y10T 428/264; Y10T 428/265; Y10T 428/27; Y10T 428/273; Y10T 428/12458
See application file for complete search history.

(56) References Cited

FOREIGN PATENT DOCUMENTS

| | | |
|---|---|---|
| JP | 11-58034 A | 3/1999 |
| JP | 2010-150649 A | 7/2010 |

* cited by examiner

SLIDING MEMBER

FIELD OF THE INVENTION

The present invention relates to a sliding material, in particular, to a sliding material having a copper alloy layer including tin on a substrate. The present invention also relates to a method for producing the sliding material, to a sliding member including the sliding material, and a bearing device.

BACKGROUND OF THE INVENTION

Various Sliding members used for internal combustion engines, bushes, or thrust washers have been proposed that includes a back metal coated with a lead-free copper alloy including tin (see e.g. JP 2010-150649 A). The copper alloy including tin has good sliding properties, seize resistance, and wear resistance, since tin enhances strength of the copper alloy to improve the wear resistance as well as improves the corrosion resistance and the sliding properties. A process for sintering a copper alloy powder on the back metal has been employed for coating the copper alloy layer on the back metal (see e.g. JP 8-209264 A).

On the other hand, JP 11-58034 A discloses a process for producing a composite material by a cast welding method or a solid joining method, in which a high strength brass alloy in a state of solid, liquid, or semi-molten phase is directly contacted on a ferrous material. The document states that sufficient bond strength is obtained since no brittle intermetallic compounds are generated between the brass alloy and the ferrous material in this process.

SUMMARY OF INVENTION

Recently, an increased load has been applied on a bearing since a power of an engine has been increased or a bearing area has been decreased due to downsizing of an engine or the like. Thus, a sliding material has been required to have higher strength. Generally speaking, as strength of a copper alloy is increased, a toughness of the alloy is decreased. For a sliding material including a high strength (lesser toughness) copper alloy sliding layer on a back metal, a shearing stress generated during sliding tends to concentrate at an interface between the copper alloy and the back metal, and a possibility of peeling is increased. Therefore, a bonding strength, as well as strength of the copper alloy itself, should be improved in order to improve the strength of the sliding material.

In the conventional process of sintering a copper alloy powder on a back metal, strength of the sliding alloy can be increased since a compositional design of the sliding alloy itself is easy. However, a bonding strength between the copper alloy and the back metal can not be increased at the same time. In case of unidirectional solidification by colliding a coolant from a back side of the steel as disclosed in JP 11-58034 A, strength of the alloy can be improved by the rapid cooling. However, a rate of solidification shrinkage of the copper alloy is increased and high peeling strength between the copper alloy and the steel is generated so that a bonding strength is reduced.

Therefore, an objective of the present invention is to provide a method for improving a bonding strength between a copper alloy including tin and a substrate when the copper alloy layer is formed on a substrate. Furthermore, an objective of the present invention is to provide a sliding material having the improved bonding strength between the copper alloy including tin and the substrate, and a sliding member including the sliding material.

As described above, factors of reducing the bonding strength between the copper alloy and the substrate is the reduction of toughness due to the increase of strength by solid-solution of tin and, in some cases, deposition of intermetallic compounds of tin. Thus, according to the present invention, the bonding strength between the copper alloy layer and the substrate is improved by reducing an amount of the solid-dissolved tin and the deposited intermetallic compounds.

According to an aspect of the present invention, a sliding material including a substrate and a copper alloy layer as a sliding layer is provide. The copper alloy includes 2.0 to 15.0% by mass of tin. The copper alloy layer includes a sliding body part including a sliding surface and a gradient region including a boundary (bond surface) with the substrate. A tin concentration in the gradient region reduces from the sliding body part toward the bond surface.

In an embodiment, a ratio of tin concentration in the gradient region is preferably from 0.1 to 0.8, more preferably 0.2 to 0.6. The "ratio of tin concentration in the gradient region" refers to a ratio of tin concentration at a vicinity of the bond surface with the substance in relation to that at a vicinity of a position contacting with the sliding body part.

In an embodiment, the copper alloy may include, by mass: 2.0 to 15.0% of tin; 0 to 30.0% of Bi; not more than 5.0% in total of one or more elements selected from a group of Al, Zn, Mn, Si, Ni, Fe, P, Zr, Ti and Mg; and the balance of copper and inevitable impurities.

The copper alloy may further include not more than 10.0% by volume of either or both of $MoS_2$ and graphite.

In an embodiment, the sliding material may further include an overlay on the copper alloy layer.

In an embodiment, the substrate preferably has a thickness of 1.0 to 25.0 mm and the copper alloy layer preferably has a thickness of 0.1 to 3.0 mm.

In an embodiment, the gradient region preferably has a thickness of 5 to 50 μm. A lower limit of the thickness of the gradient region is more preferably 10 μm, further more preferably 15 μm. An upper limit of the thickness of the gradient region is more preferably 40 μm, further more preferably 30 μm.

The substrate is preferably made of an iron-based material, such as hypereutectoid steel, eutectoid steel, hypereutectoid steel, cast iron, high-speed steel, tool steel, austenitic stainless steel, or ferritic stainless steel; or a copper-based material, such as pure copper, phosphorus bronze, brass, chromium copper, beryllium copper, or Corson alloy.

According to further aspect of the present invention, a method for producing the above sliding material is provided. The method includes: preparing the substrate having a first surface and a second surface opposite to the first surface; melting the copper alloy; casting the molten copper alloy on the first surface of the substrate; and solidifying the copper alloy unidirectionally by cooling the substrate from the second surface by a coolant.

In an embodiment, the method may further include a step of reducing a feeding amount of the coolant after a determined time period from the casting.

In an embodiment, the coolant may be water or oil.

In an embodiment, the step of preparing the substrate may include forming a cylindrical body from one or more substrate materials, and the step of casting may include casting the molten copper alloy in an inner surface of the cylinder body while rotating the cylindrical body on an central axis of the cylinder.

According to further aspect of the present invention, a sliding member including the above sliding material is provided. The sliding member may be a bearing such as a half bearing, or a bush or a thrust washer.

According to further aspect of the present invention, a bearing device including the above sliding member and a shaft is provided. The bearing device may have a unit of the shaft and a bearing, more specifically, is suitable for various engines.

Other objects, features and advantages of the invention will become apparent from the following description of the embodiments of the invention referring to the accompanying drawings. The drawings merely show non-limited embodiments.

DETAIL DESCRIPTION OF THE INVENTION

Figure 1:
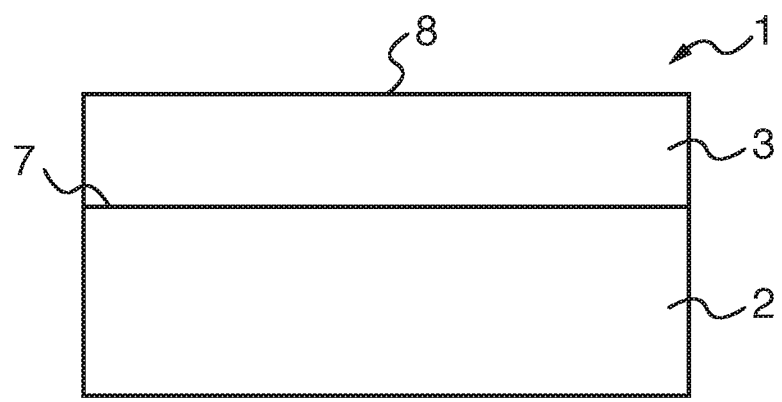
FIG. 1 depicts a schematic view of a cross section of an embodiment of the present invention.

FIG. 1 schematically depicts a cross-sectional view of the sliding material 1 according to the present invention. The sliding material 1 includes a copper alloy layer 3 on a substrate 2. The copper alloy layer 3 constitutes a sliding layer. In FIG. 1, the copper layer 3 is formed directly on the substrate 2. The substrate 2 acts for supporting the copper alloy layer 3 and securing strength of the sliding material 1. A material for the substrate may be a commercially available ferrous material such as hypoeutectic steel, eutectoid steel, hypereutectoid steel, cast iron, high-speed steel, tool steel, austenitic stainless steel, or ferritic stainless steel; or a copper-based material such as pure copper, phosphorus bronze, brass, chromium copper, beryllium copper, or Corson alloy, while other materials also may be used for the substrate.

The copper alloy layer 3 can act as a sliding layer having a sliding surface 8. The copper alloy layer 3 may include tin in an amount of 2.0 to 15.0 mass % of a total mass of the copper alloy. The copper alloy may include, other than Sn, 0 to 30.0 mass % of Bi, and not more than 5.0 mass % in total of one or more elements selected from the group of Al, Zn, Mn, Si, Ni, Fe, P, Zr, Ti and Mg. The copper alloy may further include not more than 10.0 volume % of either or both of $MoS_2$ and graphite. The copper alloy may further include dispersed particles of hard materials, such as boride, silicide, oxide, nitride or carbide of a metal element, or intermetallic compounds.

Preferably, the substance of the sliding material has a thickness of 1.0 to 25.0 mm and the copper alloy layer has a thickness of 0.1 to 3.0 mm.

Furthermore, the sliding material 1 according to the invention may include an overlay on the copper alloy layer 3. The overlay may be made of a known material, for example, soft metal material such as Sn or Bi, or a resin with dispersed solid lubricant. Even when the overlay is applied, the surface of the copper alloy layer 3, on which the overlay is applied, is referred to as "sliding surface".

Figure 2:
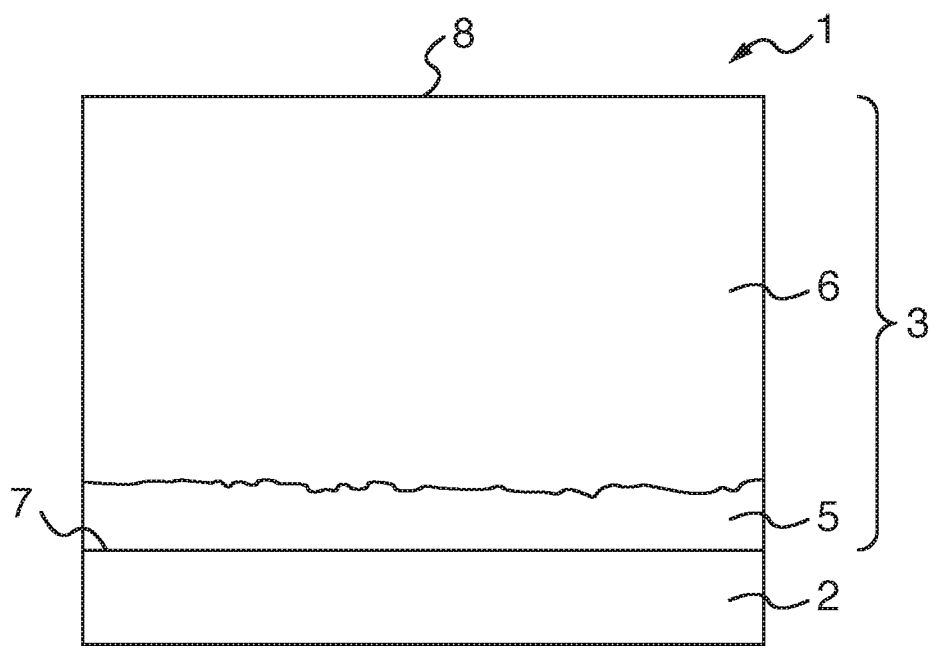
FIG. 2 depicts a schematic view of a sectional structure of a copper alloy layer in the vicinity of the boundary with a substrate of the sliding material of FIG. 1.

FIG. 2 shows a schematic sectional view of the copper alloy layer 3 around a boundary with the substrate 2 of the sliding material 1. The copper alloy layer 3 includes a sliding body part 6 and a gradient region 5. The sliding body part 6 is a main sliding part functioning as a sliding layer of the copper ally layer 3 and a surface of the sliding body part 6 constitutes a sliding surface 8 of the sliding member made of the sliding material 1. Therefore, a composition of the sliding body part, especially a tin content, is substantially identical to that of the copper alloy 3. The gradient region 5 positions between the sliding body 6 and the substrate 2 and one surface of the gradient region 5 forms a bond surface 7 between the copper alloy layer 3 and the substrate 2. In the gradient region 5, a tin concentration reduces toward the bond surface 7. The tin concentration is almost constant in the sliding body part 6 and is substantially same as that of the copper alloy 3. However, the tin concentration in the gradient region 5 reduces from an interface with the sliding body part 6 toward the bond surface 7. The tin concentration in the gradient region 5 does not always monotonously reduces, but it may reduce step-wise or increased in the way. Thus, the tin concentration in the gradient region 5 may reduce in general toward the bond surface 7. Preferably, the tin concentration reduces monotonously from the sliding body part 6 side toward the bond surface 7.

Generally, a copper alloy including tin has high strength due to solid-solution strengthening of tin and/or deposition of intermetallic compounds of tin, and thus has high seizer resistance and wear resistance as well as good sliding properties, while the alloy has small toughness. On the other hand, a copper alloy including a smaller tin concentration has smaller strength but has better toughness or ductility.

As the tin concentration reduces from the sliding body par 6 toward the bond surface 7 in the gradient region 5, its strength becomes smaller while toughness and ductility become greater. Accordingly, the gradient region 5 acts as "a stress relaxation layer" which prevents stress concentration on the bond surface 7. A load by solidification contraction and a shear stress during sliding are reduced to prevent the concentrate on the bond surface 7 and the gradient region 5 improves bonding strength. For this reason, the sliding material 1 maintains the sliding properties, seizure resistance and wear resistance of the copper alloy including tin and has improved bonding strength between the copper alloy layer 3 and the substrate 2.

Since the copper alloy layer 3 and the substrate 2 are directly bonded with each other in the sliding material 1 and there is no need to use expensive copper-plated steel material, a cost of the sliding material 1 can be low.

In order to function as the stress relaxation layer, a thickness of the gradient region 5 is preferably not less than 5 μm. When the thickness is not less than 5 μm, the load and the shear stress efficiently distribute in the layer and the bonding strength can be improved. The thickness of the gradient region 5 is more preferably not less than 10 μm, and further more preferably not less than 15 μm. If the thickness of the gradient region 5 is too great, a whole strength of the copper alloy layer 3 is decreased. Thus, the upper limit of the thickness is preferably 50 μm. The thickness of the gradient region 5 is more preferably not more than 40 urn, and further more preferably not more than 30 μm.

Since an area within 50 μm from the bond surface 7 in the gradient region 5 especially functions as the stress relaxation layer, a reduction rate of tin concentration within the area is important. Therefore, the tin concentration decrease within 50 µm from the bond surface 7 is preferably such that a ratio of the maximum tin concentration, by mass %, to the minimum tin concentration is 0.1 to 0.8, more preferably 0.2 to 0.6. Typically, the maximum tin concentration appears at a position at an interface with the sliding body part 6 and the minimum tin concentration appear at a position in a vicinity of the bond surface 7 with the substrate. Therefore, the ratio of the tin concentration at the vicinity of the bond surface 7 with the substrate 2 in relation to the tin concentration at the interface with the sliding body 6 is preferably 0.1 to 0.8, more preferably 0.2 to 0.6. Herein, this ratio of the tin concentration in the gradient region 5 is referred to as "ratio of tin concentration" or "the tin concentration ratio".

Next, a composition of the copper alloy is explained.

Sn: 2.0 to 15.0 mass %

Tin (Sn) functions to strengthen the copper alloy by solid-solution-strengthening a copper matrix of the copper alloy or by forming intermetallic compounds, and thus tin improves wear resistance. Tin also improves corrosion resistance and sliding properties. When the tin content is less than 2.0 mass %, these effects are insufficient. When the tin content exceeds 15.0 mass %, the copper alloy becomes too hard to deteriorate the sliding properties and the alloy becomes brittle and loses toughness. Therefore, the tin content is determined to be 2.0 to 15.0 mass %.

Bi: 0 to 30.0 mass %

Bismuth (Bi) forms a soft bismuth phase dispersed in the copper alloy matrix and contributes to improve wear resistance and seize resistance. However, when the bismuth content exceeds 30.0 mass %, strength of the copper alloy tends to decrease, since bismuth itself has low strength. Preferably, the bismuth content is 8.0 to 25.0 mass %.

One or more elements selected from the group of Al, Zn, Mn, Si, Ni, Fe, P, Zr, Ti and Mg: not more than 5.0 mass % in total These elements function to strengthen the copper alloy by solid-solution-strengthening a copper alloy matrix or by forming intermetallic compounds. Therefore, when the content of these elements is not more than 5.0 mass %, they contribute to strengthen the sliding material. When the content is greater, toughness of the copper tends to decrease since much intermetallic compounds precipitate. Thus, the upper limit is preferably 5.0 mass %. More preferably, the content is 0.1 to 1.1 mass %.

The copper alloy may include a solid lubricant. Either or both of $MoS_2$ and graphite may be further included up to 10.0 volume %. The solid lubricant can improve wear resistance and seize resistance of the copper alloy. When an amount of the solid lubricant exceeds 10.0 volume %, strength of the copper alloy decreases. Thus, not more than 10.0 volume % is preferable. Not more than 5.0 volume % is more preferable, and 0.5 to 2.5 volume % is further more preferable.

The copper alloy may further include hard particles up to 10.0 volume %. An amount of the hard particles is preferably 0.5 to 2.5 volume %. Preferably, the hard particles may have a size of 1 to 45 µm. The hard particles may be a boride, a silicide, an oxide, a nitride or a carbide of a metal, or an intermetallic compound. The hard particles can improve wear resistance. They may be dispersed in e.g. Bi phase in the copper layer to improve the wear resistance and seizure resistance Next, a method for producing the sliding material 1 according to the present invention is explained. In the present invention, a molten copper alloy having the above composition is cast on a substrate 2. The molten alloy is thus contacted directly with the substrate 2 to be solidified. Thus, the sliding material 1 is produced by bonding the copper alloy layer 3 with the substrate 2 by a casting method.

First, the substrate 2 is prepared. The substrate 2 may be of a shape of a flat plate or a cylinder made of the above-explained material. However, other shape may be employed.

The copper alloy having the above-explained composition is melted and cast on a surface of the substrate 2 to be bonded. It is preferable to conduct the step in an inert gas or in a reduced atmosphere or to use flux in order to prevent oxidation.

The substrate 2 is cooled by a coolant from a surface of the substrate opposite to the bonded surface with the copper alloy layer 3. The coolant may be e.g. water or oil. The water or oil is collided with the substrate 2 from the surface opposite to the bonded surface to cool the substrate 2.

When the copper alloy is thus cast and cooled, the molten copper alloy is solidified unidirectionally from a portion that first contacts the substrate 2. In the embodiments, cooling is not conducted from a free surface side of the copper alloy layer (a surface opposite to the bonded surface of the copper alloy layer).

Since a bronze alloy has a wide temperature range of solidification, the present invention utilizes micro segregation of tin in the alloy. In the method, the solidification starts from a portion of the molten copper alloy that contacts the substrate 2 and copper (a phase) is deposited as a primary crystal in a near region with the surface of the substrate. At the time, tin, which is another component of the bronze, remains in a liquid phase and moves from the bond surface side into the liquid phase. As a result, when cooling conditions is appropriately adjusted, the formed copper alloy layer 3 has a gradient region in which a tin concentration is relatively small at the bond surface 7 between the copper alloy 3 and the substrate 2.

Accordingly, since the copper alloy is unidirectionally solidified from the bond surface with the substrate 2 under a controlled cooling rate or a cooling time period, the alloy near the bond surface is rapidly cooled and solidified while the alloy near the sliding surface 8 opposite to the bonded surface is slowly cooled. In this way, the inclination of the tin concentration near the bond surface is formed.

Also, since the casting method can produce a matrix by melting the whole alloy, a lining of the copper alloy by the casting method can achieve a sufficient strength as the copper alloy layer than a method of sintering a powder.

Figure 3:
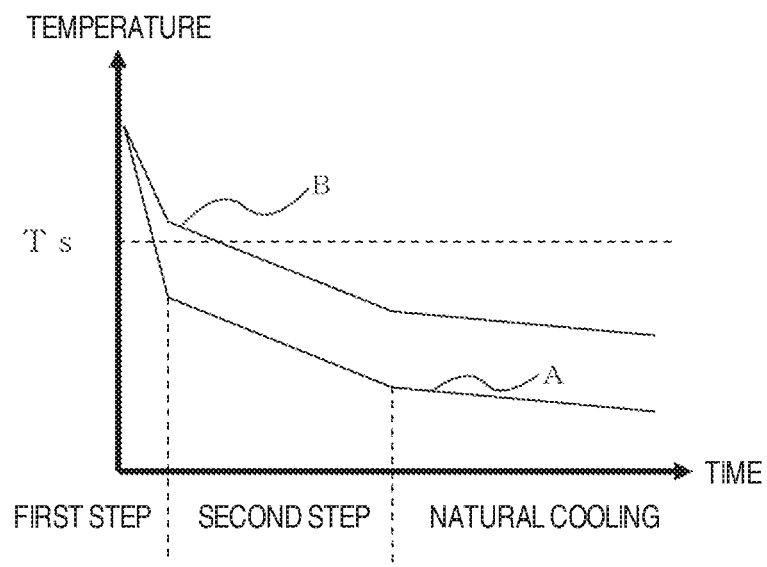
FIG. 3 depicts an example of cooling step in producing the sliding material according to the invention.

In the present invention, the controlled structure can be achieved by controlling an amount of fed coolant to the surface of the substrate 2 opposite to the bond surface. FIG. 3 shows an example of the cooling condition. A horizontal axis in the figure represents a time from a start of the casting and the vertical axis represents a temperature of the bond surface (A) and the sliding surface (B) (or the free surface of the copper alloy layer). At an earlier stage of the cooling (at the first stage), a large amount of coolant is supplied in a shorter cooling time period (for example, the amount of cooling water collided with the substrate is not smaller than 0.250 L/minutes per 1 $cm^2$ of the substrate and the cooling time period is 2.0 to 10.0 seconds per 1 mm of a thickness of the substrate). In the subsequent second stage, the amount of supplied water collided with the substrate is decreased and in a longer cooling time period (for example, the amount of cooling water is not larger than 0.100 L/minute). After the second step, the alloy is allowed to naturally cool. At the end of the first stage, the temperature of the bond surface of the copper alloy layer becomes lower than starting temperature of solidification (Ts) of the copper alloy and thus the copper alloy starts to solidify. However, the temperature of the sliding surface is higher than Ts, and the copper alloy is still in the molten phase. In the second stage, the sliding surface also solidifies slowly. The controlled process allows to primarily crystallize the α copper phase in the vicinity of the bond surface and form the gradient tin concentration within a certain area. The thickness of the gradient region and the tin concentration gradient can be controlled by an amount of the supplied coolant.

As an embodiment of conducting the method, dams may be built on a base plat and a molten copper alloy may be poured in an area on the base plate and surrounded by the dams. It is preferable to conduct in an inert gas or in a reducing atmosphere, or use flux to prevent oxidation of the base and the copper alloy. The cooling by the coolant is conducted form the back side of the substrate (the base plate) as described above.

In another embodiment, centrifugal casting may be applied. Needless to say, the present invention is not limited by these casting methods.

Figure 4:
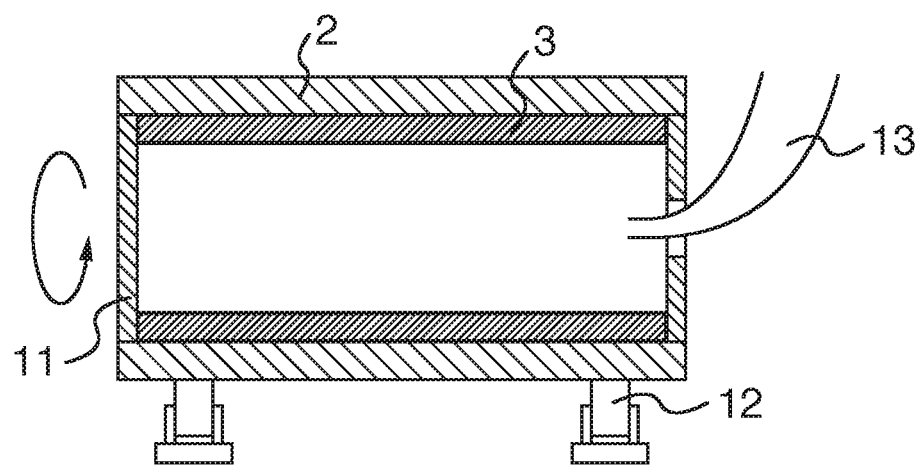
FIG. 4 depicts a schematic view of a centrifugal casting method.

FIG. 4 shows a schematic view of the centrifugal casting. A plate material 2 for a substrate is formed in a cylindrical shape and both ends are sealed by sealing members 11. The cylindrically formed substrate 2 is rotated horizontally with a high speed by a rotating device 12 such as rotation rollers. Preferably, an inside of the cylinder is vacuumed or reduced or filled with an inert gas. A molten copper alloy is poured through a gate 13 at the end of the cylindrical substrate. The substrate 2 is cooled from an outside by supplying a coolant. The molten copper alloy adheres to the inner surface of the cylindrical substrate 2 and then solidifies while the inner surface of the copper alloy keeps a perfect circle, thereby the copper alloy layer is produced. The centrifugal casting process can apply to production of a cylindrical sliding bearing for example.

Then, explained is a method of measuring the gradient region in the copper alloy layer at the bond surface with the substrate. A sectional structure of the sliding material is observed with an electron microscope (for example, at 1000 magnifications) and a distribution of tin is measured along a direction perpendicular to the sliding surface or a thickness direction in the vicinity of the bond surface of the copper alloy layer with the substrate and by a line analysis or an area analysis with EDX. Since the tin concentration of a sliding body part is substantially same as that of the whole copper alloy which forms the copper alloy layer 3, the gradient region is determined as an area in which the tin concentration decreases from the constant value in the sliding body part toward the bond surface.

EXAMPLES

Examples 1 to 21 of the invention and comparison examples 1 to 5 were produced and the gradient region and the bonding strength were evaluated.

Preparation of the Substrate

A plate made of a steel SPCC was used as a substrate, and an upper surface of the steel plate was scraped at a central area with remaining all side to produce an open box-shape which has dams at all sides to prevent leakage of a molten alloy. A thickness for the cast was designed to be 5 mm. A thickness of an area to become the substrate of the sliding material was designed to be 6 mm. The surface of the substrate was covered by molten borax as an antioxidant, and the substrate was preheated at a temperature of 1000 to 1200° C. in a reducing $H_2$ gas atmosphere.

Casting of the Copper Alloy

Pure copper, pure tin, and other component material/materials were blended according to the compositions of the copper alloys of Examples 1 to 21 and Comparative Examples 1 to 5 in tables 1 and 2, and were melted in an air. The molten alloys were kept at a temperature of 1100 to 1200° C. in an air and poured on the preheated substrate.

Cooling Process

After the pouring, cooling water was collided with a bottom of the substrate from water spray nozzles located below the substrate. For Comparative Examples, a small amount of cooling water was collided continuously (flow rate of the cooling water was 40 L/min, and a cooling time period was 180 seconds). On the other hand, for Examples 1 to 7 and 13 to 21, intentionally discontinuous two-stage cooling was conducted as shown in FIG. 3. In the early of the cooling (first stage), a large amount of cooling water was supplied for shorter cooling time period (the cooling water flow rate was 85 L/min and the cooling time period was 30 seconds). In the next stage the cooling (second stage), a smaller amount of cooling water than that the first stage was supplied for longer cooling time period (the cooling water flow rate was 20 L/min and the cooling time period was 60 seconds). After the two stages of the cooling, the copper alloy was allowed to naturally cool in an air until an ambient temperature. For Example 8 to 12, the amount of cooling water at the first stage was increased compared with that for Examples 1 to 7 and 13 to 21 (the cooling water flow rate was 130 L/min and the cooling time period was 20 seconds) to enhance the cooling effect. The cooling conditions thereafter were same as those for Examples 1 to 7 and 13 to 21.

Method of Evaluating Tin Concentration Ratio

EPMA device (type: JXA-8530F FIELD EMISSION ELECTRON PROBE MICROANALYZER, JEOL) was used to observe a view field of a cross section of 85 μm and 116 μm of each sample. An image was taken such that the bond surface becomes along the 116 μm direction. A line analyze was conducted by EDS of the EPMA device and the tin distribution in the vicinity of the bond surface was measured. A ratio of tin accounts obtained by the line analyze was evaluated as the tin concentration ratio. The images were taken more than 10 areas for each sample.

Measurement of Bonding Strength

The bonding strength between the copper alloy layer and the substrate was evaluated by a ratio of shear strength between the copper alloy and the substrate in relation to tensile strength of the copper alloy (shear strength/tensile strength). Since the shear strength correlates to the tensile strength, the ratio between the shear strength and the tensile strength was made an index of the bonding strength, thereby materials having different compositions can be compared.

Figure 5:
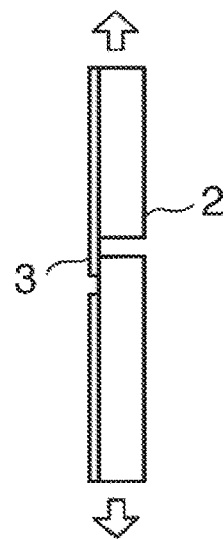
FIG. 5 depicts a schematic view of a shearing test.

A test piece for measuring the shearing strength was processed as shown in FIG. 5. A test piece is produced such that the copper alloy layer and the substrate were bonded by a predetermined area. A tensile load was applied at both ends and increased until the test piece breaks at the bonded area. The shear strength was determined as the tensile stress when the test piece breaks (see JP 2002-223852 A).

Table 1 shows the measurement results of whether the gradient region was observed or not, the thickness (μm) of the gradient region if it exists, the ratio of the tin concentration in the gradient region, and the bonding strength (shear strength/tensile strength) in the columns, respectively, "Presence or absence of gradient region", "Thickness of gradient region (μm)", "Ratio of tin concentration" and "Shear strength/Tensile strength". Please note that if the gradient region was not observed, the "Ratio of tin concentration" indicates a ratio of the tin concentration at the vicinity of the bond surface in relation to that at 50 μm distant from the bond surface.

In the cooling condition for Comparative Examples 1 to 5, the gradient region was not observed, and reduction of the tin concentration at the vicinity of the bond surface was not observed in some samples.

In the cooling condition for Examples 1 to 7, the ratio of tin concentration was almost constant between the samples regardless of their tin contents. However, in the condition for Examples 8 to 12, the ratio of tin concentration tends to reduce as the tin content increases.

Figure 6:
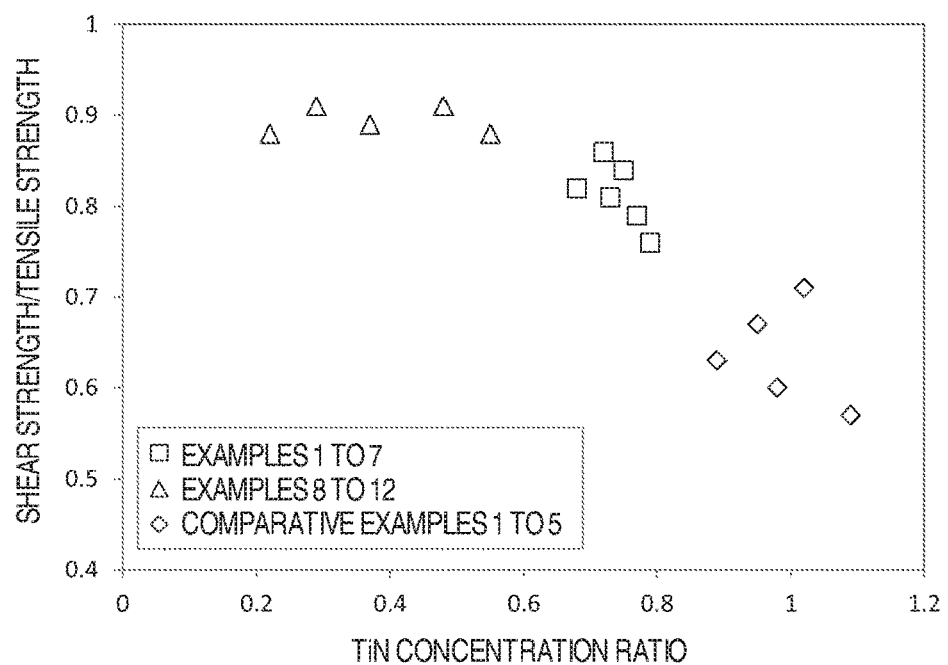
FIG. 6 shows a relation between a tin concentration ratio and a shear strength/tensile strength.

The shear strength of Examples 1 to 12, which have the ratio of tin concentration of not more than 0.8, have the ratio of shear strength to tensile strength of not less than 0.76. These values were much greater than those of Comparative examples 1 to 5. FIG. 6 shows a relationship between the ratio of shear strength/tensile strength to the ratio of tin concentration. A high correlation is seen from the figure between the ratio of tin concentration and the ratio of shear strength/tensile strength. Especially, when the ratio of tin concentration was not more than 0.6 (in Examples 8 to 12), the ratio of shear strength/tensile strength was not less than 0.88 and high bonding strength was obtained.

TABLE 1

| No. | Composition (mass %) Cu | Sn | Presence or absence of gradient region | Thickness of gradient region (μm) | Ratio of tin concentration | Shear strength/ Tensile strength |
|---|---|---|---|---|---|---|
| Example 1 | balance | 2.2 | presence | 14 | 0.75 | 0.84 |
| Example 2 | balance | 5.3 | presence | 18 | 0.68 | 0.82 |
| Example 3 | balance | 5.2 | presence | 4 | 0.79 | 0.76 |
| Example 4 | balance | 5.1 | presence | 57 | 0.73 | 0.81 |
| Example 5 | balance | 8.4 | presence | 23 | 0.72 | 0.86 |
| Example 6 | balance | 12.8 | presence | 21 | 0.77 | 0.79 |
| Example 7 | balance | 15.0 | presence | 38 | 0.77 | 0.79 |
| Example 8 | balance | 2.2 | presence | 20 | 0.48 | 0.91 |
| Example 9 | balance | 5.3 | presence | 29 | 0.29 | 0.91 |
| Example 10 | balance | 8.4 | presence | 15 | 0.37 | 0.89 |
| Example 11 | balance | 12.8 | presence | 21 | 0.55 | 0.88 |
| Example 12 | balance | 15.0 | presence | 22 | 0.22 | 0.88 |
| Comparative Example 1 | balance | 2.2 | absence | — | 1.02 | 0.71 |
| Comparative Example 2 | balance | 5.3 | absence | — | 0.89 | 0.63 |
| Comparative Example 3 | balance | 8.4 | absence | — | 0.95 | 0.67 |
| Comparative Example 4 | balance | 12.8 | absence | — | 0.98 | 0.60 |
| Comparative Example 5 | balance | 15.0 | absence | — | 1.09 | 0.57 |

As described above, the cooling condition for Comparative Examples 1 to 5, that for Examples 1 to 7, and that for Example 8 to 12 are different with one another. From the results in Table 1, the gradient region was not observed in the Comparative examples for which two-stage cooling condition was not applied. However, the gradient region was observed in all Examples of the invention. Between samples having same tin content, they have much different ratios of tin concentration according to the cooling conditions, and Examples 8 to 12 which were subjected to most strong cooling have the smallest ratio. Thus, adjusting of the cooling condition can achieve the ratio of tin concentration of not more than 0.8, furthermore not more than 0.6, regardless of the tin content.

Examples 13 to 21 includes other elements (Bi, Zn, Al, Fe, Ni, Mn, Si, P, Zr, Ti, Mg), or hard particles of Mo$_2$C or solid lubricant particles of graphite (Gr) in addition to the composition (Cu— about 8% tin) of Example 5. Cooling condition for Examples 13 to 21 was same as that for Example 5.

Table 2 shows test results. Even though the element/particle is added, the ratio of tin concentration were in a range of 0.64% to 0.79%, which is equivalent to 0.72 of Example 5. Thus, the bonding strength (shear strength/tensile strength) was 0.76 to 0.87, which is equivalent to 0.86 of Example 5. The results show that the added element/elements or particles have only a small effect on the ratio of tin concentration and to the bonding strength.

TABLE 2

| No. | Composition (mass % or volume %*) | | | Presence or absence of gradient region | Thickness of gradient region (μm) | Ratio of tin concentration | Shear strength/ Tensile strength |
|---|---|---|---|---|---|---|---|
| | Cu | Sn | others | | | | |
| Example 5 | balance | 8.4 | — | presence | 23 | 0.72 | 0.86 |
| Example 13 | balance | 7.8 | Bi: 24.8 | presence | 28 | 0.64 | 0.77 |
| Example 14 | balance | 7.4 | Zn: 3.1 | presence | 42 | 0.75 | 0.82 |
| Example 15 | balance | 8.0 | Al: 1.5, Fe: 1.0 | presence | 11 | 0.72 | 0.84 |
| Example 16 | balance | 8.1 | Ni: 0.9 | presence | 22 | 0.74 | 0.81 |
| Example 17 | balance | 8.1 | Mn: 1.5, Si: 0.5 | presence | 19 | 0.69 | 0.79 |
| Example 18 | balance | 7.6 | Fe: 1.0, P: 0.15 | presence | 24 | 0.67 | 0.76 |
| Example 19 | balance | 9.0 | Zr: 0.05, Ti: 0.05, Mg: 0.05 | presence | 19 | 0.79 | 0.87 |
| Example 20 | balance | 8.0 | Mo2C: 1.5 volume % | presence | 20 | 0.70 | 0.81 |
| Example 21 | balance | 7.3 | Gr: 1.0 volume % | presence | 31 | 0.65 | 0.76 |
| Comparative Example 3 | balance | 8.4 | — | absence | — | 0.95 | 0.67 |

*The composition is represented by mass % except explicitly expressed as "volume %".

The invention claimed is:

1. A sliding material comprising:
   a substrate; and
   a copper alloy layer bonded to the substrate, the copper alloy comprising 2.0 to 15.0% by mass of tin,
   wherein the copper alloy layer comprises
   a gradient region including a bond surface with the substrate, and
   a sliding body part including a surface opposite to the bond surface,
   wherein a tin concentration in the gradient region reduces from the sliding body part toward the bond surface, and
   wherein a ratio of tin concentration in the gradient region is 0.1 to 0.8 by mass percentage.

2. The sliding material according to claim 1, wherein the ratio is 0.2 to 0.6.

3. The sliding material according to claim 1, wherein the copper alloy comprises, by mass,
   2.0 to 15.0% of tin,
   0 to 30.0% of Bi,
   not more than 5.0% in total of one or more elements selected from a group consisting of Al, Zn, Mn, Si, Ni, Fe, P, Zr, Ti and Mg, and
   the balance of copper and inevitable impurities.

4. The sliding material according to claim 1, wherein the copper alloy includes at least one of MoS$_2$ or graphite, and either or both of the MoS$_2$ and the graphite is equal to or less than 10.0% by volume.

5. The sliding material according to claim 1, further comprising an overlay on the copper alloy layer.

6. The sliding material according to claim 1, wherein the substrate has a thickness of 1.0 to 25.0 mm and the copper alloy layer has a thickness of 0.1 to 3.0 mm.

7. The sliding material according to claim 1, wherein the gradient region has a thickness of 10 to 50 μm.

8. A sliding member comprising the sliding material according to claim 1.

9. A bearing device comprising the sliding member according to claim 8 and a shaft.

10. A method for producing the siding material according to claim 1, comprising:
    preparing the substrate having a first surface and a second surface;
    melting the copper alloy;
    casting the molten copper alloy on the first surface of the substrate; and
    solidifying the copper alloy unidirectionally by cooling the substrate from the second surface by a coolant.

11. The method according to claim 10, wherein further comprising a step of reducing a feeding amount of the coolant after a predetermined time period from the casting.

12. The method according to claim 10, wherein the coolant is water or oil.

13. The method according to claim 10,
    wherein the step of preparing the substrate comprises forming a cylindrical body from one or more substrate materials, and
    the step of casting comprises casting the molten copper alloy in an inner surface of the cylinder body while rotating the cylindrical body on a central axis of the cylinder.

* * * * *